United States Patent
Murayama et al.

(10) Patent No.: US 8,389,606 B2
(45) Date of Patent: Mar. 5, 2013

(54) ASPHALT MIXTURE

(75) Inventors: Masato Murayama, Tokyo (JP);
Masakazu Kawano, Tokyo (JP);
Yukihiro Fukuyama, Iwade (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 13/203,348

(22) PCT Filed: Mar. 8, 2010

(86) PCT No.: PCT/JP2010/053820
§ 371 (c)(1),
(2), (4) Date: Nov. 10, 2011

(87) PCT Pub. No.: WO2010/104048
PCT Pub. Date: Sep. 16, 2010

(65) Prior Publication Data
US 2012/0059093 A1    Mar. 8, 2012

(30) Foreign Application Priority Data

Mar. 11, 2009  (JP) .................................. 2009-058374
Dec. 16, 2009  (JP) .................................. 2009-285735

(51) Int. Cl.
*C08L 95/00* (2006.01)
(52) U.S. Cl. ........................................................ 524/59
(58) Field of Classification Search .................... 524/59, 524/68
See application file for complete search history.

(56) References Cited

U.S. PATENT DOCUMENTS

| 4,058,641 A | * | 11/1977 | Hnojewyj | ..................... 427/137 |
| 4,237,036 A | * | 12/1980 | Goodrich | ........................ 524/59 |

FOREIGN PATENT DOCUMENTS

| JP | 46-1383 | | 9/1971 |
| JP | 52-137424 | A | 11/1977 |
| JP | 54-69136 | A | 6/1979 |
| JP | 54-122333 | A | 9/1979 |
| JP | 6-158607 | A | 6/1994 |
| JP | 2001-131388 | A | 5/2001 |

OTHER PUBLICATIONS

International Search Report, dated Jun. 8, 2010, issued in PCT/JP2010/053820.

* cited by examiner

*Primary Examiner* — Peter Szekely
(74) *Attorney, Agent, or Firm* — Birch, Stewart, Kolasch & Birch, LLP

(57) ABSTRACT

The present invention relates to an asphalt mixture including aggregates, a polyamide resin and asphalt, wherein the polyamide resin has a softening point of from 60 to 150° C., and is compounded in an amount of from 3 to 90% by mass on the basis of a total amount of the polyamide resin and the asphalt; and a paving method using the asphalt mixture. The asphalt mixture of the present invention provides a pavement which is free from rutting and torsional breakage and exhibits a high oil resistance. The pavement obtained from the asphalt mixture is free from fracture and can be prevented from suffering from occurrence of rutting and torsional breakage even when leakage of oils over a surface of the pavement occurs.

9 Claims, No Drawings

ASPHALT MIXTURE

FIELD OF THE INVENTION

The present invention relates to asphalt mixtures and a paving method using the asphalt mixtures.

BACKGROUND OF THE INVENTION

Asphalt pavement using an asphalt mixture has been frequently employed for paving driveways, parking spaces, cargo yards, sidewalks, etc., because of relatively easy construction and a short period of time from beginning of paving works to traffic opening. For example, in current driveways in Japan, 95% of a whole paved road surface thereof have been constructed from the asphalt pavement.

The asphalt pavement includes a road surface which is formed of an asphalt mixture containing aggregates bonded with each other through asphalt, and exhibits a good hardness and a good durability.

However, asphalt produced by refining of petroleum is apt to be dissolved in similar petroleum refined products such as gasoline, light oils, heavy oils and engine lubricants. For this reason, if these oils are dropped on the road surface owing to leakage of fuels or lubricants from vehicles, etc., the asphalt tends to be dissolved in the oils at an early stage after being paved, which will lead to erosion of the asphalt mixture and occurrence of pavement fracture such as formation of pot holes. Therefore, in such a case, repair of the pavement is inevitably needed, which results in increased maintenance costs and significant influence on car traffic.

To take measures against these problems, cement concrete pavements have been used because they are excellent in oil resistance and durability as compared to the asphalt pavements. However, in the cement concrete pavements, a laying speed thereof tends to be low owing to need of a prolonged time upon curing of the cement, and removal of concrete plates is required upon repair. Thus, the cement concrete pavements are hardly adoptable in practice because it is very difficult to avoid a large adverse influence on traffic.

On the other hand, as the paving method using an asphalt-based mixture having a high laying speed, there is considered a paving method using a semi-flexible asphalt mixture for pavements which has a relatively high oil resistance. The pavement using the semi-flexible asphalt mixture is constructed by curing a cement milk filled into voids of an open-graded asphalt mixture, and therefore exhibits a high rutting resistance and an excellent durability owing to the cured cement. The semi-flexible asphalt mixture has a good oil resistance as compared to ordinary asphalt mixtures, but needs such a complicated procedure that after laying the open-graded asphalt mixture as a mother material, the cement milk is injected into the voids of the asphalt mixture. As a result, similarly to the cement concrete pavements, there tend to occur such a problem that a laying time for constructing the pavement using the semi-flexible asphalt mixture is two or more times the laying time when using ordinary asphalt mixtures.

In addition, there is also known a paving method using another type of an asphalt-based mixture in which an epoxy asphalt mixture containing an epoxy resin having a relatively high oil resistance is used. The epoxy asphalt mixture is such an asphalt mixture prepared by replacing about 15 to 30% of asphalt in the ordinary asphalt mixture with an epoxy resin. The epoxy resin used in the epoxy asphalt mixture is in the form of a reactive resin constituted from two liquids including a main resin component and a curing agent. The cured product of the epoxy resin is undissolved in oils and therefore exhibits a relatively high oil resistance, and a pavement obtained by using the epoxy asphalt mixture has a high rutting resistance and an excellent durability owing to the cured epoxy resin.

However, the epoxy asphalt mixture is cured by reaction of the epoxy resin, so that a laying workability thereof is largely influenced by a temperature used for mixing respective components thereof. If the mixing temperature is excessively high, the resulting epoxy asphalt mixture tends to be cured too fast, thereby failing to suitably lay the mixture on a road surface. When the mixing temperature is excessively low, the epoxy asphalt mixture tends to be cured too slowly, thereby causing problems such as a prolonged time until traffic opening and occurrence of early rutting after the traffic opening. Further, the use of the epoxy asphalt mixture of a two-liquid type needs a special apparatus for addition of the epoxy resin.

As an alternative measure, it is considered to use a modified asphalt prepared by compounding a thermoplastic elastomer such as typically SBS (styrene-butadiene-styrene block copolymer) in asphalt. In fact, the modified asphalt has an effect of enhancing a resistance to rutting and cracking which will be caused in asphalt pavements. In recent years, the modified asphalt has been put into practice in many cases. The modified asphalt is considered to exhibit a higher oil resistance than straight asphalts owing to a high viscosity thereof. However, since many of the thermoplastic elastomers used in the modified asphalt are in the form of a petroleum product, the modified asphalt is apt to be dissolved in petroleum-based oils, resulting in inevitable occurrence of pavement fracture such as formation of pot holes.

Thus, the conventionally known methods have failed to solve the above-described problems.

On the other hand, various methods for enhancing properties of the asphalt pavement have been proposed.

For example, JP 3-17304β discloses the method in which a planar material having a net-work structure which is produced by coating a fiber bundle of aromatic polyamide fibers having a fiber diameter of 12 μm with a vinyl chloride resin is used as a reinforcing material for an asphalt mixed material, and disposed in a grid-like manner in the asphalt mixed material to enhance a rutting resistance of the asphalt mixed material.

However, it is usually difficult to increase an amount of the polyamide compounded in such a fibrous material, i.e., the amount of the polyamide compound therein is limited to about several % on the basis of the asphalt in view of a good workability of the resulting material. In addition, even when the asphalt compounded with the fibrous polyamide is subjected to heat-mixing and compaction upon forming a pavement, it will be difficult to uniformly disperse the polyamide fibers over the pavement. As a result, when oils are leaked on the paved surface, the pavement tends to hardly exhibit a good oil resistance. Further, in the paving method described in JP 3-17304A, after laying the net-work structure composed integrally of the fibers and the thermoplastic resin on a road surface, the asphalt mixed material is applied on the net-work structure. Therefore, the paving method requires a number of steps for laying these materials, resulting in problems such as a prolonged laying time.

Under these circumstances, it has been required to provide an asphalt mixture which is relatively readily laid over a road surface and has advantages such as a high laying speed and a short period of time from beginning of paving work to traffic opening, and which is further capable of realizing construction of a pavement having an excellent oil resistance and a high durability.

On the other hand, there is such a proposal that an amide compound is used for asphalt pavement.

U.S. Pat. No. 6,786,963 discloses a paving composition containing an amide compound such as a diamide compound as an anti-stripping agent.

SUMMARY OF THE INVENTION

The present invention relates to the following aspects [1] and [2].
[1] An asphalt mixture including aggregates, a polyamide resin and asphalt, wherein the polyamide resin has a softening point of from 60 to 150° C., and is compounded in an amount of from 3 to 90% by mass on the basis of a total amount of the polyamide resin and the asphalt.
[2] A paving method including the step of compacting the asphalt mixture as defined in the above aspect [1].

DETAILED DESCRIPTION OF THE INVENTION

The amide compounds used in the conventional asphalt paving techniques using an amide compound, for example, in Examples of U.S. Pat. No. 6,786,963, are in the form of a viscous liquid material having a softening point not higher than room temperature. For this reason, in the methods described in U.S. Pat. No. 6,786,963, it may be difficult to suppress occurrence of rutting when the temperature of the paved road surface increases.

The present invention relates to an asphalt mixture capable of providing an asphalt pavement which is prevented from suffering from occurrence of rutting and torsional breakage and has a high oil resistance. Specifically, the asphalt pavement produced using the asphalt mixture according to the present invention is free from fracture and can be prevented from suffering from occurrence of rutting and torsional breakage even when oils leakage onto the pavement surface occurs. In addition, the present invention also relates to a paving method which is capable of producing an asphalt pavement having the above-described properties and in which the asphalt pavement can be laid in a relatively facilitated manner at a high laying speed, and the time required from beginning of the paving work to traffic opening can be shortened.

The present inventors have found that an asphalt mixture prepared by compounding a specific polyamide resin with aggregates and asphalt can realize production of an asphalt pavement which is excellent in durability and oil resistance.
[Polyamide Resin]

The polyamide resin used in the present invention is a thermoplastic resin having a softening point of from 60 to 150° C. If a polyamide resin having a softening point of lower than 60° C. is used, the resulting asphalt pavement tends to be hardly prevented from suffering from occurrence of rutting on the surface thereof when the temperature of the pavement surface increases during the summer season. If a polyamide resin having a softening point of higher than 150° C. is used, the obtained asphalt mixture tends to exhibit a high viscosity, resulting in poor workability (for example, rugged surface), and the resulting asphalt pavement may fail to maintain an adequate density and therefore tends to be deteriorated in durability. In consequence, the softening point of the polyamide resin is preferably from 70 to 140° C. and more preferably from 90 to 130° C.

The polyamide resin used in the present invention preferably has a melt viscosity of 2000 mPa·s or less as measured at 180° C. The use of the polyamide resin having a melt viscosity of 2000 mPa·s or less as measured at 180° C. enables production of a pavement having an adequate density and a good durability without deterioration in workability (for example, laying property) of the resulting asphalt mixture. The melt viscosity of the polyamide resin as measured at 180° C. is more preferably 1000 mPa·s or less, and still more preferably 500 mPa·s or less. On the other hand, the melt viscosity of the polyamide resin as measured at 180° C. is preferably 50 mPa·s or more. The polyamide resin having a melt viscosity of 50 mPa·s or more can maintain a good dispersibility between the polyamide resin and the asphalt. From the same viewpoint, the melt viscosity of the polyamide resin as measured at 180° C. is more preferably 80 mPa·s or more, and still more preferably 120 mPa·s or more.

Accordingly, from the viewpoints of a good workability (for example, a good laying property) of the resulting asphalt mixture and a good dispersibility between the polyamide resin and the asphalt therein, the melt viscosity of the polyamide resin as measured at 180° C. is preferably from 50 to 2000 mPa·s, more preferably from 50 to 1000 mPa·s, still more preferably from 80 to 500 mPa·s and further still more preferably from 120 to 500 mPa·s.

Meanwhile, the softening point of the polyamide resin may be measured by a ring and ball method according to JIS K 2531-1960, whereas the melt viscosity of the polyamide resin may be measured using a vibration-type viscometer "CJV-2000" available from Chichibu Taiheiyo Cement Corp.

The polyamide resin having the above-described properties may have any chemical structure as long as it is in the form of a high-molecular compound having an amide bond (—CONH—). For example, as the polyamide resin, there may be used nylons having an aliphatic skeleton as a main backbone, aramids having an aromatic skeleton as a main backbone, or other kinds of polyamide resins.

Many of these polyamide resins are commercially available, and polyamide resins having desired properties may be readily selected therefrom.

The polyamide resins may be usually obtained by various reactions such as a ring-opening polymerization reaction of cyclic lactams, a self-condensation reaction of amino acids or derivatives thereof and a polycondensation reaction between a polycarboxylic acid and an amine compound.
(Polyamide Resins Obtained by Polycondensation Reaction Between Polycarboxylic Acid and Amine Compound)

The polyamide resins obtained by a polycondensation reaction between a polycarboxylic acid and an amine compound may be produced, for example, by the following method.

Examples of the polycarboxylic acid as one of the raw materials used in the polycondensation reaction include divalent carboxylic acids such as adipic acid, sebacic acid, dodecandioic acid, phthalic acid, isophthalic acid, terephthalic acid, succinic acid, alkenyl succinic acids (preferably those alkenyl succinic acids containing an alkenyl group having 4 to 20 carbon atoms), dimer acids (for example, those dimer acids obtained from vegetable fats and oils), cyclohexanedicarboxylic acid and naphthalenedicarboxylic acid; and trivalent carboxylic acids such as 1,2,4-benzene-tricarboxylic acid.

Examples of the amine compounds as the other raw material used in the polycondensation reaction include polyamines, amino carboxylic acids and amino alcohols. Specific examples of the polyamines include aliphatic diamines such as ethylenediamine, hexamethylenediamine and propylenediamine; aliphatic triamines such as diethylenetriamine; aromatic diamines such as xylylenediamine and diphenylmethane diamine; and alicyclic diamines such as piperazine and isophorone diamine. Specific examples of the amino carboxylic acids include methyl glycine, trimethyl glycine, 6-aminocaproic acid, δ-aminocaprylic acid and ε-caprolactam. Specific examples of the amino alcohols include ethanol amine and propanol amine.

These compounds used as the raw materials in the polycondensation reaction may be respectively used alone or in the form of a mixture of any two or more thereof.

The above polycarboxylic acids and the amine compounds may be subjected to condensation (polycondensation) reaction to obtain the polyamide resins. The production conditions of the polyamide resins are described in detail hereinlater.

(Polyamide Resins Obtained by Polycondensation Reaction Between Carboxylic Acid Component Containing Aliphatic Monocarboxylic Acid and Polymerized Fatty Acid, and Amine Component Containing Polyamine)

In the present invention, there are preferably used such polyamide resins which are obtained by using a carboxylic acid component containing an aliphatic monocarboxylic acid and a polymerized fatty acid in place of the above polycarboxylic acid and using an amine component containing a polyamine as the above amine compound, and subjecting the carboxylic acid component and the amine component to condensation reaction.

The above polyamide resins are readily found to be those capable of satisfying desired properties including the above softening point and melt viscosity as required for the polyamide resin used in the present invention. Further, the use of these polyamide resins can realize production of the asphalt pavement which is further prevented from suffering from occurrence of rutting and torsional breakage, and further enhanced in oil resistance.

For example, when the aliphatic monocarboxylic acid and the polymerized fatty acid are used as the carboxylic acid component, the resulting polyamide resins can be readily controlled in melt viscosity. In general, when the proportion of the aliphatic monocarboxylic acid in the carboxylic acid component increases, the melt viscosity of the resulting polyamide resins tends to be lowered.

(Proportions of Aliphatic Monocarboxylic Acid and Polymerized Fatty Acid Compounded)

The compounding proportions of the aliphatic monocarboxylic acid and the polymerized fatty acid constituting the carboxylic acid component of the polyamide resin are preferably from 10 to 50 mole equivalent % and from 50 to 90 mole equivalent %, respectively, and more preferably from 10 to 30 mole equivalent % and from 90 to 70 mole equivalent %, respectively, on the basis of a whole amount of the carboxylic acid component.

In addition, the carboxylic acid component may also contain the other carboxylic acids in addition to the aliphatic monocarboxylic acid and the polymerized fatty acid. Examples of the other carboxylic acids include aliphatic dicarboxylic acids and aromatic carboxylic acids. The other carboxylic acids are preferably compounded in the carboxylic acid component in an amount of from 0 to 40 mole equivalent % and more preferably from 0 to 20 mole equivalent % on the basis of a whole amount of the carboxylic acid component.

(Aliphatic Monocarboxylic Acid)

As the aliphatic monocarboxylic acid, there are preferably used aliphatic monocarboxylic acids having 1 to 22 carbon atoms, and more preferably aliphatic monocarboxylic acids having 3 to 20 carbon atoms.

Also, the aliphatic monocarboxylic acids may be used in combination of any two or more kinds thereof. In this case, a mixture of the aliphatic monocarboxylic acid having 1 to 4 carbon atoms and the aliphatic monocarboxylic acid having 12 to 22 carbon atoms is preferably used, and a mixture of the aliphatic monocarboxylic acid having 2 to 4 carbon atoms and the aliphatic monocarboxylic acid having 14 to 20 carbon atoms is more preferably used.

When using such a mixture of the aliphatic monocarboxylic acids in place of the aliphatic monocarboxylic acid singly, the crystallinity of the resulting polyamide resin is lowered, and the softening point of the polyamide resin is readily controlled, e.g., may be reduced to a temperature of 150° C. or lower.

The mixing ratio between the aliphatic monocarboxylic acid having 1 to 4 carbon atoms and the aliphatic monocarboxylic acid having 12 to 22 carbon atoms in the mixture thereof may be controlled such that the former and latter aliphatic monocarboxylic acids are preferably present in amounts of from 10 to 90 mole equivalent % and from 90 to 10 mole equivalent %, respectively, more preferably from 40 to 80 mole equivalent % and from 20 to 60 mole equivalent %, respectively, and still more preferably from 45 to 75 mole equivalent % and from 55 to 25 mole equivalent %, respectively, on the basis of a whole amount of the aliphatic monocarboxylic acids.

Examples of the aliphatic monocarboxylic acid having 1 to 4 carbon atoms include acetic acid, propionic acid and butyric acid. These aliphatic monocarboxylic acids having 1 to 4 carbon atoms may be used alone or in combination of any two or more thereof.

The aliphatic monocarboxylic acid having 12 to 22 carbon atoms may be either saturated or unsaturated. Examples of the saturated aliphatic monocarboxylic acid having 12 to 22 carbon atoms include lauric acid, palmitic acid, stearic acid, arachidic acid and behenic acid. Examples of the unsaturated aliphatic monocarboxylic acid having 12 to 22 carbon atoms include oleic acid, linoleic acid, linolenic acid, eicosenoic acid, and mixed fatty acids obtained from natural fats and oils (for example, tall oil fatty acids, rice bran oil fatty acids, soybean oil fatty acids and beef tallow fatty acids). These aliphatic monocarboxylic acids having 12 to 22 carbon atoms may be used alone or in combination of any two or more thereof.

(Polymerized Fatty Acid)

The polymerized fatty acid constituting the carboxylic acid component of the polyamide resin is a polymer obtained by polymerizing a monobasic fatty acid having an unsaturated bond(s) or an esterified product thereof.

As the a monobasic fatty acid having an unsaturated bond(s), there may be usually used, for example, unsaturated fatty acids with 1 to 3 unsaturated bonds having 8 to 24 carbon atoms in total. Examples of the unsaturated fatty acids include oleic acid, linoleic acid, linolenic acid and natural drying or semi-drying oil fatty acids. Examples of the esterified product of the monobasic fatty acid having an unsaturated bond(s) include esters of the monobasic fatty acid having an unsaturated bond(s) with an aliphatic alcohol, preferably with an aliphatic alcohol having 1 to 3 carbon atoms.

The polymerized fatty acid in the form of a polymer of the monobasic fatty acid having an unsaturated bond(s) or the esterified product thereof preferably contains a dimer thereof as a main component. For example, the polymerized fatty acid may be commercially available as a polymer of an unsaturated fatty acid having 18 carbon atoms which is composed of from 0 to 10% by mass of a monobasic acid having 18 carbon atoms (monomer), from 60 to 99% by mass of a dibasic acid having 36 carbon atoms (dimer) and 30% by mass or less of a tribasic acid having 54 carbon atoms or a higher-basic acid (trimer or higher-order isomer).

(Polyamine)

Examples of the polyamine contained in the amine component used together with the above carboxylic acid component include aliphatic diamines, aliphatic triamines and aromatic diamines. These polyamines may be used alone or in the form of a mixture of any two or more thereof.

Among them, the amine component preferably contains the above respective polyamines at such a mixing ratio that the aliphatic diamines are present in an amount of from 20 to 100 mole equivalent %, and the aliphatic triamines and/or the aromatic diamines are present in an amount of 0 to 80 mole equivalent %, on the basis of a whole amount of the amine component, more preferably at such a mixing ratio that the aliphatic diamines are present in an amount of from 50 to 95 mole equivalent %, and the aliphatic triamines and/or the aromatic diamines are present in an amount of 50 to 5 mole equivalent %, on the basis of a whole amount of the amine component, and still more preferably at such a mixing ratio that the aliphatic diamines are present in an amount of from 70 to 90 mole equivalent %, and the aliphatic triamines and/or the aromatic diamines are present in an amount of 10 to 30 mole equivalent %, on the basis of a whole amount of the amine component.

In addition, among the aliphatic triamines and the aromatic diamines, preferred are the aromatic diamines.

When using the aliphatic diamines in combination with the aliphatic triamines and/or the aromatic diamines, the resulting polyamide resin can be more suitably controlled in softening point and melt viscosity.

For example, when the content of the aliphatic triamines or the aromatic polyamines in the amine compound increases, the softening point of the resulting polyamide resin tends to be lowered. Whereas, when the content of the aliphatic diamines in the amine compound increases, the softening point of the resulting polyamide resin tends to become higher.

The above aliphatic diamines are preferably those having 2 to 4 carbon atoms. Examples of the aliphatic diamines having 2 to 4 carbon atoms include ethylenediamine, propylenediamine and butylenediamine.

The above aliphatic triamines are preferably those having 2 to 8 carbon atoms. Examples of the aliphatic triamines having 2 to 8 carbon atoms include diethylenetriamine, dipropylenetriamine and dibutylenetriamine.

The above aromatic diamines are preferably those having 6 to 7 carbon atoms. Examples of the aromatic diamines having 6 to 7 carbon atoms include xylylenediamine, diaminophenyl methane and phenylenediamine.

In the present invention, the amine component may also contain the other amine components in addition to the above aliphatic diamines, aliphatic triamines and aromatic diamines in an amount of from 0 to 30 mole equivalent %. Examples of the other amine components include aliphatic monoamines having 1 to 4 carbon atoms, trivalent or higher-valent aromatic polyamines and alicyclic polyamines.

Specific examples of the aliphatic monoamines having 1 to 4 carbon atoms include ethyl amine, propyl amine and butyl amine.

Specific examples of the trivalent or higher-valent aromatic polyamines include aromatic amine compounds having 6 to 10 carbon atoms such as triaminobenzene, triaminophenol and tetraaminobenzene.

Specific examples of the alicyclic polyamines include alicyclic polyamines having 6 to 17 carbon atoms such as 1,2-diaminocyclohexane, 4,4'-methylenebis(cyclohexyl amine), 4,4'-methylenebis(methylcyclohexyl amine), 4,4'-methylenebis(ethylcyclohexyl amine) and 1,8-diaminomethane.

(Production of Polyamide Resin)

The polyamide resin used in the present invention may be produced by subjecting the above respective raw material compounds to condensation reaction under the conventionally known reaction conditions. For example, the carboxylic acid component such as a monocarboxylic acid or a polycarboxylic acid and the amine component such as a polyamine compound may be mixed with each other at a mole equivalent ratio (carboxylic acid component/amine component) of from 1.0/1.2 to 1.2/1.0, and are heated, for example, to a temperature of from 180 to 250° C. to subject both the components to condensation reaction. In this case, the respective raw materials are appropriately selected, and the reaction conditions such as reaction time and reaction temperature are suitably controlled to obtain a polyamide resin having desired properties or characteristics.

[Asphalt]

The asphalt used in the present invention is not particularly limited, and various kinds of asphalts may be used in the present invention. Examples of the asphalt include straight asphalts as petroleum asphalts for pavements, as well as polymer-modified asphalts produced by modifying asphalt with a polymer material including a thermoplastic elastomer such as styrene/butadiene block copolymers (SBS), styrene/isoprene block copolymers (SIS) and ethylene/vinyl acetate copolymers (EVA). Specific examples of the polymer-modified asphalts include polymer-modified asphalts of II type and polymer-modified asphalts of H type.

Examples of a mixed type of asphalt (mixture of asphalt and the below-mentioned aggregate) include a dense-graded asphalt mixture, a stone mastic asphalt (SMA) mixture and a porous asphalt mixture.

[Aggregate or the Like]

The aggregates used in the present invention are not particularly limited, and may be optionally selected from crushed stone, cobble, gravel, reclaimed aggregates and ceramics.

In the present invention, other additives may also be compounded in the aggregates, if required.

[Asphalt Mixture]

In the asphalt mixture according to the present invention, it is required that the compounding ratio of the polyamide resin lies within the range of from 3 to 90% by mass on the basis of a total amount of the polyamide resin and the asphalt. When the compounding ratio of the polyamide resin on the basis of the total amount of the polyamide resin and the asphalt is less than 3% by mass, the resulting asphalt mixture may fails to exhibit a sufficient effect of improving an oil resistance thereof. The effect of the polyamide resin compounded in the asphalt mixture becomes more remarkable as the compounding ratio thereof increases. Therefore, the compounding ratio of the polyamide resin is preferably 5% by mass or more, more preferably 10% by mass or more, still more preferably 15% by mass or more, and further still more preferably 20% by mass or more, on the basis of the total amount of the polyamide resin and the asphalt.

On the other hand, even when the compounding ratio of the polyamide resin on the basis of the total amount of the polyamide resin and the asphalt is more than 90% by mass, the effect of improving an oil resistance of the resulting asphalt mixture tends to be no longer enhanced corresponding to the increased compounding ratio of the polyamide resin. Therefore, such a high compound ratio of the polyamide resin rather tends to be economically disadvantageous, and there might occur such a risk that the asphalt pavement obtained from the asphalt mixture suffers from deteriorated flexibility and occurrence of cracking. In addition, in the production process, the asphalt mixture must be subjected to heating and mixing treatments at a higher temperature than usually used (for example, higher than 200° C.) owing to the larger amount of the polyamide resin compounded, which tends to induce heat deterioration of the polyamide resin. Furthermore, when the amount of the polyamide resin compounded becomes large, it may be difficult to compact the resulting asphalt mixture, so that the workability upon laying the asphalt mixture tends to be deteriorated. In consequence, the compounding ratio of the polyamide resin in the asphalt mixture on the basis of the total amount of the polyamide resin and the asphalt is preferably 80% by mass or less, more preferably 70% by mass or less, still more preferably 60% by mass or less, and further still more preferably 50% by mass or less.

From the above viewpoints, the compounding ratio of the polyamide resin in the asphalt mixture is preferably from 5 to 80% by mass, more preferably from 10 to 70% by mass, still more preferably from 15 to 60% by mass, and further still more preferably from 20 to 50% by mass, on the basis of the total amount of the polyamide resin and the asphalt.

The function and mechanism of preventing occurrence of rutting and torsional breakage on the resulting asphalt pavement and enhancing an oil resistance thereof by compounding the polyamide resin in the asphalt mixture according to the present invention are considered as follows.

In the asphalt mixture containing the polyamide resin having the properties as defined in the present invention, the polyamide resin itself can exhibit a property of being undissolved in petroleum-based oils. Further, the polyamide resin having the specific softening point is apt to be uniformly dispersed in the asphalt mixture when subjecting the asphalt mixture to heating and mixing treatments. Therefore, when compacting such an asphalt mixture in which the polyamide resin is uniformly dispersed, it is possible to complete construction of the asphalt pavement having desired properties. As a result, the polyamide resin is allowed to be uniformly present over a surface layer of the asphalt pavement, so that a whole portion of the surface layer of the asphalt pavement can be protected by the polyamide resin. That is, since deformation of the asphalt pavement due to vehicle weights can be well absorbed by the polyamide resin having a high elasticity and an excellent oil resistance, it is considered that the asphalt pavement is prevented from suffering from occurrence of rutting and torsional breakage and can exhibit a high oil resistance.

Thus, as the concentration of the polyamide resin which is uniformly dispersed in the surface layer of the asphalt pavement increases, the oil resistance of the asphalt pavement can be enhanced. Specifically, the effect of improving the oil resistance of the asphalt pavement can be suitably recognized when the compounding ratio of the polyamide resin in the asphalt mixture on the basis of the total amount of the polyamide resin and the asphalt reaches 3% by mass or more, the effect can be considerably enhanced when the compounding ratio of the polyamide resin in the asphalt mixture on the basis of the total amount of the polyamide resin and the asphalt reaches 10% by mass or more, the effect can be more remarkably enhanced when the compounding ratio of the polyamide resin in the asphalt mixture on the basis of the total amount of the polyamide resin and the asphalt reaches 15% by mass or more, and the still higher effect can be recognized when the compounding ratio of the polyamide resin in the asphalt mixture on the basis of the total amount of the polyamide resin and the asphalt reaches 20% by mass or more.

Meanwhile, the term "uniformly dispersed" as used herein means that the asphalt mixture is kept in a uniformly dispersed state as a whole. That is, strictly speaking, the asphalt mixture containing the aggregates and various asphalts is incapable of exhibiting a completely uniformly dispersed state. Accordingly, in the present invention, the uniformly dispersed state of the asphalt mixture means such a condition in which the respective components are approximately uniformly dispersed in the asphalt mixture.

(Proportions of Respective Components Compounded in Asphalt Mixture)

In the asphalt mixture of the present invention, the ratio of an amount of the aggregates compounded therein to a total amount of the asphalt and the polyamide resin compounded therein is not particularly limited, and may be usually determined as follows. For example, the above ratio is preferably controlled such that the aggregates is present in an amount of from 98 to 85% by mass, and the asphalt and the polyamide are present in a total amount of from 2 to 15% by mass, and more preferably controlled such that the aggregates is present in an amount of from 97 to 90% by mass, and the asphalt and the polyamide are present in a total amount of from 3 to 10% by mass.

Meanwhile, the compounding ratio of asphalt in the conventional asphalt mixtures containing aggregates and the asphalt may be determined by referring to an optimum asphalt amount obtained from "Formulation and Design of Asphalt Mixture" as described in "Guideline for Pavement Design and Construction" published by Japan Road Association.

In the present invention, the above optimum asphalt amount corresponds to the total amount of the asphalt and the polyamide resin. Therefore, the total amount of the asphalt and the polyamide resin compounded in the asphalt mixture is preferably determined from such an optimum asphalt amount.

However, as a matter of course, the method of determining the amounts of the respective components in the asphalt mixture is not particularly limited to the above method as described in "Guideline for Pavement Design and Construction", and the amounts of the respective components in the asphalt mixture may also be determined by any other methods.

The asphalt mixture of the present invention may be used in the form of a heated asphalt mixture containing substantially no water, or may also be used in the form of a cold asphalt mixture which is an asphalt emulsion prepared by compounding an emulsifier or water into the above asphalt mixture. Among these asphalt mixtures, preferred is the heated asphalt mixture containing substantially no water. The heated asphalt mixture is produced by heating asphalt and aggregates at a temperature of from 140 to 180° C., and therefore contains substantially no water. The heated asphalt mixture is thus produced and used in a temperature range which is different from that for the cold mixture in the form of an asphalt emulsion.

In the asphalt mixture of the present invention, the polyamide resin is apt to be uniformly dispersed in the asphalt mixture. Therefore, the asphalt mixture of the present invention can effectively exhibit its properties when used in the form of the heated asphalt mixture.

The method for producing the asphalt mixture of the present invention when used in the form of the heated asphalt mixture is not particularly limited, and the asphalt mixture of the present invention may be produced by any suitable methods. For example, the asphalt mixture of the present invention may be produced according to any ordinary method for producing asphalt mixtures containing aggregates and asphalt.

In this case, the temperature used upon mixing the aggregates, the polyamide resin and the asphalt is preferably higher than the softening point of the polyamide resin. More specifically, the mixing temperature is preferably in the range of from 100 to 200° C., more preferably from 120 to 200° C., still more preferably from 140 to 190° C., and further still more preferably from 140 to 180° C.

As the specific production method, there may be used the conventional method for production of asphalt mixtures which is known as a so-called plant mix method in which, in the step of mixing aggregates with asphalt, the polyamide resin (for example in the form of pellets) may be charged together with the asphalt into the aggregates. However, in this case, in order to melt the polyamide resin, the aggregates is preferably previously heated to a higher temperature than usually used (for example to 180° C.).

In addition, the asphalt and the polyamide resin may be previously mixed while stirring at an elevated temperature, for example, at a temperature of 150° C. or higher, and then the thus heated mixture may be added (premix method).

As described above, in the method for producing the asphalt mixture by compounding the polyamide resin thereto, the polyamide resin tends to be exposed to the elevated temperature. It is required that the elevated temperature is set to a higher value as the compounding ratio of the polyamide resin increases. Therefore, when the compounding ratio of the polyamide resin increases, the asphalt mixture is exposed to a higher temperature and therefore tends to suffer from heat deterioration. Such a phenomenon tends to occur more remarkably as the softening point of the polyamide resin used becomes higher.

In the present invention, the polyamide resin used has a relatively low softening point, and the compounding ratio of the polyamide resin in the asphalt mixture is preferably reduced. Therefore, the asphalt mixture of the present invention is capable of providing a good pavement which is free from heat deterioration.

[Paving Method]

The paving method according to the present invention includes the step of compacting the above asphalt mixture.

In the paving method, when using the asphalt mixture of the present invention in which the above polyamide resin is compound, the compacting step may be carried out using the same laying machines and the same laying method as used for ordinary asphalt mixtures.

The temperature upon compacting the asphalt mixture when used in the form of a heated asphalt mixture is preferably higher than the softening point of the polyamide resin, and more specifically is preferably from 100 to 200° C., more preferably from 120 to 180° C. and still more preferably from 130 to 170° C.

According to the paving method of the present invention, it is possible to realize construction of an asphalt pavement which is excellent in durability and oil resistance. In addition, in the paving method of the present invention, the asphalt pavement can be constructed in a relatively facilitated manner at a high laying speed, and the time required from beginning of paving work to traffic opening can be shortened.

EXAMPLES

Next, the present invention is described in more detail by referring to the following Examples. However, these Examples are only illustrative and not intended to limit the invention thereto.

The properties and laying workability of the asphalt mixture were evaluated by the following methods.

(1) Marshall Stability Test

The test for stability of pavement was carried out according to "Marshall Stability Test" described in "Handbook of Pavement Investigation and Examination Methods" published by Japan Road Association.

(2) Wheel Tracking Test

The rutting test was carried out according to "Wheel Tracking Test" described in "Handbook of Pavement Investigation and Examination Methods" published by Japan Road Association. The limit value (upper limit) of measurement of a testing device used in the above test was 63000 frequencies/mm.

(3) Bending Test

The bending test was carried out according to "Bending Test Method" described in "Handbook of Pavement Investigation and Examination Methods" published by Japan Road Association.

(4) Torsional Resistance Test

The torsional resistance test was carried out according to "Torsional Resistance Test Method" described in "Handbook of Pavement Investigation and Examination Methods" published by Japan Road Association.

(5) Kerosene Immersion Test (Evaluation of Oil Resistance)

The sample (asphalt mixture) was immersed in kerosene at normal temperatures for 24 h, and then subjected to the above respective tests to evaluate properties thereof.

(6) Laying Workability

The laying workability of a sample (asphalt mixture) maintained in a 150° C. heated state when constructing a pavement with the asphalt mixture using a scoop was evaluated according to the following evaluation criteria.

<Evaluation Criteria>

A: No problem concerning laying workability of the sample occurred as compared to general dense-graded asphalt mixtures, and the sample was adequately compacted.

B: Some difficulty in laying the sample occurred and a laying time thereof was prolonged as compared to general dense-graded asphalt mixtures.

C: Poor laying workability of the sample occurred as compared to general dense-graded asphalt mixtures, and the sample was difficult to adequately compact.

Examples 1 to 5

In a mixture containing dense-graded aggregates and an optimum asphalt amount of straight asphalt 60/80 (dense-graded asphalt mixture; hereinafter referred to as "dense-graded StAs"), 3% by mass, 10% by mass, 20% by mass, 40% by mass and 90% by mass of the amount of the asphalt were respectively replaced with a polyamide A "Reomide S-8400" available from Kao Corp., which was produced by the following method, to obtain various raw material mixtures. These raw material mixtures were respectively mixed in a mixer at a temperature of from 150 to 160° C., and then compacted at a temperature of from 135 to 145° C. to obtain asphalt mixtures of Examples 1 to 5. The thus obtained asphalt mixtures were evaluated for their formulation, initial properties, properties after immersion in kerosene and laying workability. The results are shown in Table 1.

Meanwhile, the optimum asphalt amount, mixing temperature and compacting temperature described above and in Table 1 correspond to optimum asphalt amount, optimum mixing temperature and optimum compacting temperature, respectively, as determined according to "Guideline for Pavement Design and Construction".

<Method for Production of Polyamide Resin A and Properties Thereof>

The polyamide resin A was produced by subjecting a carboxylic acid component containing propionic acid, a tall oil fatty acid and a polymerized fatty acid ("HARI-DIMER 250" available from Harima Chemicals, Inc.) and an amine component containing ethylenediamine and m-xylylenediamine to condensation reaction. The contents of the respective compounds in the carboxylic acid component were adjusted such that propionic acid and the tall oil fatty acid were present in a total amount of 0.25 mole equivalent and the polymerized fatty acid was present in an amount of 0.75 mole equivalent per 1 mole equivalent of the carboxylic acid component, whereas the contents of the respective compounds in the amine component were adjusted such that ethylenediamine was present in an amount of 0.86 mole equivalent and m-xylylenediamine was present in an amount of 0.14 mole equivalent per 1 mole equivalent of the amine component. The proportion between the carboxylic acid component and the amine component (carboxylic acid component/amine component) was adjusted to 1.0/1.0 in terms of a mole equivalent ratio therebetween.

The polyamide resin A had a softening point of 123° C. and a melt viscosity of 210 mPa·s as measured at 180° C.

Example 6

In a mixture of stone mastic-graded aggregates and an optimum asphalt amount of a polymer-modified asphalt II type (stone mastic asphalt mixture; hereinafter referred to as "SMA II Type"), 20% by mass of the asphalt were replaced with the polyamide resin A to obtain a raw material mixture. The thus obtained raw material mixture was mixed at a temperature of from 170 to 180° C. as an optimum mixing temperature thereof, and then compacted at a temperature of from 155 to 165° C. as an optimum compacting temperature thereof to thereby obtain an asphalt mixture of Example 6. The thus obtained asphalt mixture was evaluated for its formulation, initial properties, properties after immersion in kerosene and laying workability. The results are shown in Table 1.

Example 7

In a mixture of porous (open-graded) aggregates and an optimum asphalt amount of a polymer-modified asphalt H type (porous asphalt mixture; hereinafter referred to as "Porous H Type"), 20% by mass of the asphalt were replaced with the polyamide resin A to obtain a raw material mixture. The thus obtained raw material mixture was mixed at a temperature of from 165 to 175° C. as an optimum mixing temperature thereof, and then compacted at a temperature of from 140 to 150° C. as an optimum compacting temperature thereof to thereby obtain an asphalt mixture of Example 6. The thus obtained asphalt mixture was evaluated for its formulation, initial properties, properties after immersion in kerosene and laying workability. The results are shown in Table 1.

Example 8

The same procedure as in Example 4 was repeated except for using a polyamide resin D produced by the following method in place of the polyamide resin A, thereby obtaining an asphalt mixture of Example 8. The thus obtained asphalt mixture was evaluated for its formulation, initial properties, properties after immersion in kerosene and laying workability. The results are shown in Table 1.

<Method for Production of Polyamide Resin D and Properties Thereof>

The raw materials including 0.19 mole equivalent of propionic acid, 0.06 mole equivalent of a tall oil fatty acid ("HAR TALL FA-1" available from Harima Chemicals, Inc.), 0.75 mole equivalent of a polymerized fatty acid ("HARI-DIMER 250" available from Harima Chemicals, Inc.), 0.90 mole equivalent of ethylenediamine and 0.10 mole equivalent of m-xylylenediamine were charged into a four-necked round-bottom flask equipped with a thermometer, a stirring system, a dehydration tube and a nitrogen blowing tube, and mixed while stirring. After flowing a small amount of nitrogen through the contents of the flask for preventing coloration thereof, the contents of the flask were reacted at 210° C. for 3 h and then under reduced pressure (13.3 kPa) for 2 h, cooled and then pulverized, thereby obtaining the polyamide resin D.

The polyamide resin D had a softening point of 135° C. and a melt viscosity of 220 mPa·s as measured at 180° C.

Meanwhile, the raw materials for production of the polyamide resin D and the properties of the resulting polyamide resin D are shown together in Table 1.

Comparative Examples 1 to 3

The same procedures as in Examples 1, 6 and 7 were repeated except that no polyamide resin A was compounded, thereby obtaining asphalt mixtures of Comparative Examples 1, 2 and 3, respectively. The thus obtained asphalt mixtures were evaluated for their formulation, initial properties, properties after immersion in kerosene and laying workability. The results are shown in Table 2.

Comparative Examples 4 and 5

The same procedure as in Example 6 was repeated except for using respective polyamide resins B and C produced by the following methods in place of the polyamide resin A, thereby obtaining asphalt mixtures of Comparative Examples 4 and 5, respectively. The thus obtained asphalt mixtures were evaluated for their formulation, initial properties, properties after immersion in kerosene and laying workability. The results are shown in Table 2.

<Polyamide Resin B>

The polyamide resin B was produced in the same manner as described for production of the polyamide resin D except for using, as the raw materials, 0.22 mole equivalent of a tall oil fatty acid ("HAR TALL FA-1" available from Harima Chemicals, Inc.), 0.78 mole equivalent of dodecanedioic acid, 0.475 mole equivalent of ethylenediamine and 0.475 mole equivalent of m-xylylenediamine. The thus obtained polyamide resin B had a softening point of 180° C. and a melt viscosity of 400 mPa·s as measured at 180° C.

<Polyamide Resin C>

The polyamide resin C was produced in the same manner as described for production of the polyamide resin D except for using, as the raw materials, 0.30 mole equivalent of adipic acid, 0.70 mole equivalent of a polymerized fatty acid ("HARI-DIMER 250" available from Harima Chemicals, Inc.), 0.85 mole equivalent of ethylenediamine and 0.07 mole equivalent of m-xylylenediamine. The thus obtained polyamide resin C had a softening point of 170° C. and a melt viscosity of 4000 mPa·s as measured at 180° C.

The raw materials for production of the polyamide resins B and C and the properties of the polyamide resins B and C are shown together in Table 1.

TABLE 1

|  |  |  | Polyamide resin B | Polyamide resin C | Polyamide resin D |
|---|---|---|---|---|---|
| Equivalent ratios of raw materials charged (mole equivalent) | Carboxylic acid component | Propionic acid | — | — | 0.19 |
|  |  | Tall oil fatty acid | 0.22 | — | 0.06 |
|  |  | Adipic acid | — | 0.30 | — |
|  |  | Dodecanedioic acid | 0.78 | — | — |
|  |  | Polymerized fatty acid | — | 0.70 | 0.75 |
|  | Amine component | Ethylenediamine | 0.475 | 0.85 | 0.90 |
|  |  | m-Xylylenediamine | 0.475 | 0.07 | 0.10 |
| Properties |  | Melt viscosity as measured at 180° C. (mPa·s) | 400 | 4000 | 220 |
|  |  | Softening point (° C.) | 180 | 170 | 135 |

TABLE 2

|  |  |  |  |  | Examples | | | | | | | |
|---|---|---|---|---|---|---|---|---|---|---|---|---|
| | | Items No. | | | 1 | 2 | 3 | 4 | 5 | 6 | 7 | 8 |
| Formulation | Formulation of mixture | Mixed type of asphalt | | | Dense-graded StAs | | | | | SMA II type | Porous H type | Dense-graded StAs |
| | | Mixed type (or Aggregates graded type) | | | Dense-graded | | | | | SMA | Porous | Dense-graded |
| | | Asphalt type | | | StAs 60/80 | | | | | II type | H type | StAs 60/80 |
| | | Optimum asphalt amount (% by mass) (total amount of asphalt and polyamide resin) | | | 5.3 | 5.3 | 5.6 | 5.8 | 5.8 | 6.5 | 5.2 | 5.8 |
| | | Compounding ratio of polyamide resin A (*1: B; *2: C; *3: D) (% by mass) (based on total amount of asphalt and polyamide resin) | | | 3 | 10 | 20 | 40 | 90 | 20 | 20 | 40*3 |
| | | Void percentage (%) | | | 4.2 | 4.2 | 4.3 | 4.3 | 4.5 | 2.5 | 20 | 4.3 |
| | Properties of polyamide resin added | Softening point (° C.) | | | 123 | 123 | 123 | 123 | 123 | 123 | 123 | 135 |
| | | Melt viscosity as measured at 180° C. (mPa·s) | | | 210 | 210 | 210 | 210 | 210 | 210 | 210 | 220 |
| Evaluation results | Initial properties | Marshall stability | (a) Test Temp.: 20° C. | Stability (kN) | 72.6 | 77.2 | ≧80 | ≧80 | ≧80 | ≧80 | 39.5 | ≧80 |
| | | | (b) Test Temp.: 60° C. | Stability (kN) | 13.0 | 18.1 | 24.9 | 40.4 | 61.7 | 16.9 | 9.5 | 42.7 |
| | | | (c) Test Temp.: 60° C. | Stability after immersed in water for 48 h (kN) | 8.7 | 14.3 | 20.8 | 36.8 | 59.0 | 15.8 | 8.1 | 37.9 |
| | | | | Water immersion residual stability (c/b) (%) | 66.9 | 79.0 | 83.5 | 91.1 | 95.6 | 93.5 | 85.3 | 88.8 |
| | | Wheel tracking | (1) Test Temp.: 60° C. | Dynamic stability (freq./mm) | 2520 | 10500 | 63000 | 63000 | 63000 | 63000 | 31500 | 63000 |
| | | Torsional resistance | Test Temp.: 60° C. | Displacement after elapse of 90 min (mm) (breaking time) | 12.4 | 2.5 | 1.3 | 0.1 | 0.1 | 0.8 | 1.1 | 0.1 |
| | | Bending property | Test Temp.: −10° C. | Strength at breaking (MPa) | 6.9 | 6.4 | 6.8 | 9.2 | 8.4 | 11.3 | 5.1 | 9.0 |
| | | | | Strain at breaking (×10$^{-3}$) | 4.0 | 4.2 | 4.6 | 5.4 | 5.8 | 5.6 | 6.2 | 5.1 |
| | Properties after immersion in kerosene | Marshall stability | (d) Test Temp.: 60° C. | Stability (kN) | 8.7 | 13.7 | 21.6 | 36.4 | 59.5 | 15.4 | 7.1 | 38.1 |
| | | | | Kerosene immersion residual stability (d/b) (%) | 66.9 | 75.7 | 86.7 | 90.1 | 96.4 | 91.1 | 74.7 | 89.2 |
| | | Wheel tracking | (2) Test Temp.: 60° C. | Dynamic stability (freq./mm) | 210 | 2100 | 63000 | 63000 | 63000 | 63000 | 5725 | 63000 |
| | | | | Kerosene immersion residual DS ((2)/(1)) (%) | 8 | 20 | 100 | 100 | 100 | 100 | 18 | 100 |
| | | Torsional resistance | Test Temp.: 60° C. | Displacement after elapse of 90 min (mm) (breaking initiation time) | Broken (34 min) | 13.7 | 1.5 | 0.4 | 0.2 | 0.8 | 4.7 | 0.3 |
| | Laying workability | | | | A | A | A | A | B | A | A | A |

TABLE 3

| | | | | | Comparative Examples | | | | |
|---|---|---|---|---|---|---|---|---|---|
| | | Items No. | | | 1 | 2 | 3 | 4 | 5 |
| Formulation | Formulation of mixture | Mixed type of asphalt | | | Dense-graded StAs | SMA II type | Porous H type | SMA II type | SMA II type |
| | | Mixed type (or Aggregates graded type) | | | Dense-graded | SMA | Porous | SMA | SMA |
| | | Asphalt type | | | StAs 60/80 | II type | H type | II type | II type |
| | | Optimum asphalt amount (% by mass) (total amount of asphalt and polyamide resin) | | | 5.3 | 6.0 | 5.0 | 6.5 | 6.5 |
| | | Compounding ratio of polyamide resin A (*1: B; *2: C; *3: D) (% by mass) (based on total amount of asphalt and polyamide resin) | | | 0 | 0 | 0 | 20*1 | 20*2 |
| | | Void percentage (%) | | | 4.2 | 2.5 | 20 | 6.4 | 7.0 |
| | Properties of polyamide resin added | Softening point (° C.) | | | — | — | — | 180 | 170 |
| | | Melt viscosity as measured at 180° C. (mPa·s) | | | — | — | — | 400 | 4000 |
| Evaluation results | Initial properties | Marshall stability | (a) Test Temp.: 20° C. | Stability (kN) | 69.9 | 48.1 | 36.2 | 50.4 | 45.0 |
| | | | (b) Test Temp.: 60° C. | Stability (kN) | 11.6 | 8.2 | 5.4 | 19.9 | 17.8 |
| | | | (c) Test Temp.: 60° C. | Stability after immersed in water for 48 h (kN) | 7.3 | 7.1 | 4.4 | 17.1 | 14.8 |
| | | | | Water immersion residual stability (c/b) (%) | 62.9 | 86.6 | 81.5 | 85.9 | 83.1 |
| | | Wheel tracking | (1) Test Temp.: 60° C. | Dynamic stability (freq./mm) | 643 | 5250 | 7000 | 12500 | 10500 |
| | | Torsional resistance | Test Temp.: 60° C. | Displacement after elapse of 90 min (mm) (breaking time) | Broken (53 min) | 3.6 | 2.7 | Broken (31 min) | Broken (27 min) |
| | | Bending property | Test Temp.: −10° C. | Strength at breaking (MPa) | 7.3 | 11.5 | 5.3 | 11.6 | 10.7 |
| | | | | Strain at breaking ($\times 10^{-3}$) | 3.9 | 6.1 | 8.1 | 6.9 | 6.3 |
| | Properties after immersion in kerosene | Marshall stability | (d) Test Temp.: 60° C. | Stability (kN) | 7.1 | 5.8 | 0.2 | 17.4 | 15.1 |
| | | | | Kerosene immersion residual stability (d/b) (%) | 61.2 | 70.7 | 3.7 | 87.4 | 84.8 |
| | | Wheel tracking | (2) Test Temp.: 60° C. | Dynamic stability (freq./mm) | Not measurable | 4200 | Not measurable | 7000 | 5250 |
| | | | | Kerosene immersion residual DS ((2)/(1)) (%) | 0 | 80 | 0 | 56 | 50 |
| | | Torsional resistance | Test Temp.: 60° C. | Displacement after elapse of 90 min (mm) (breaking initiation time) | Broken (19 min) | 15.1 | Broken (1 min) | Broken (5 min) | Broken (4 min) |
| | Laying workability | | | | A | A | A | C | C |

Meanwhile, the details of abbreviations appearing in Tables 1 and 2 are as follows.

1) Dense-graded StAs: Using straight asphalt 60/80 in a dense-graded asphalt mixture (maximum aggregates size: 13 mm)

2) SMA II Type: Using a polymer-modified asphalt II type in a stone mastic asphalt (SMA) mixture (maximum aggregates size: 13 mm)

3) Porous H type: Using a polymer-modified asphalt H type in a porous asphalt mixture having a void percentage of 20% (maximum aggregates size: 13 mm)

As recognized from Tables 1 and 2, the asphalt mixtures compounded with the polyamide resin having the specific softening point according to the present invention were excellent in all of Marshall stability, dynamic stability in wheel tracking test, torsional resistance, and initial properties such as bending property, and less deteriorated in their properties even after immersion in kerosene, as well as exhibited a good laying workability (Examples 1 to 8). On the contrary, the asphalt mixtures obtained in Comparative Examples in which the specific polyamide resin was not used or the other kinds of polyamide resins were used, failed to exhibit these excellent properties (Comparative Examples 1 to 5).

Industrial Applicability

The asphalt mixture according to the present invention is capable of providing an asphalt pavement which can be prevented from suffering from occurrence of rutting and torsional breakage, and can exhibit a high oil resistance. Further, even when any oil leakage on the pavement surface occurs, the pavement obtained from the asphalt mixture is free from fracture, and can be prevented from suffering from occurrence of rutting and torsional breakage. In addition, the asphalt mixture of the present invention can be readily laid over a road surface and has such an advantage that the time required from beginning of paving work to traffic opening is shortened. Therefore, the asphalt mixture of the present invention can be effectively used as an asphalt mixture for pavements.

The invention claimed is:

1. An asphalt mixture comprising:
   aggregates;
   polyamide resin; and
   asphalt,
   wherein the polyamide resin has a softening point of from 60 to 150° C., and is compounded in an amount of from 3 to 90% by mass on the basis of a total amount of the polyamide resin and the asphalt, and
   the polymide resin is obtained by polycondensing a carboxylic acid component containing an aliphatic monocarboxylic acid and a polymerized fatty aid with an amine component containing a polyamine.

2. The asphalt mixture according to claim 1, wherein the polyamide resin is compounded in an amount of from 10 to 70% by mass on the basis of a total amount of the polyamide resin and the asphalt.

3. The asphalt mixture according claim 1, wherein the polyamide resin ha a softening point of from 70 to 140° C.

4. The asphalt mixture according to claim 1, wherein the polyamide resin has a melt viscosity of 2000 mPa·s or lower as measured at 180° C.

5. The asphalt mixture according to claim 1, wherein the polyamide resin has a melt viscosity of from 50 to 1000 mPa·s as measured at 180° C.

6. The asphalt mixture according to claim 1, wherein a content of the aliphatic monocarboxylic acid in the carboxylic acid component is from 10 to 50 mole equivalent % on the basis of a whole amount of the carboxylic acid component.

7. The asphalt mixture according to claim 1, wherein the aliphatic monocarboxylic acid is in the form of a mixture comprising an aliphatic monocarboxylic acid having 1 to 4 carbon atoms and an aliphatic monocarboxylic acid having 12 to 22 carbon atoms.

8. The asphalt mixture according to claim 1, wherein the polyamine contained in the gamine component is in the form of a mixture comprising an aliphatic diamine, and an aliphatic triamine and/or an aromatic diamine.

9. A paving method comprising a step of compacting the asphalt mixture as defined in claim 1.

* * * * *